3,512,451
Patented May 19, 1970

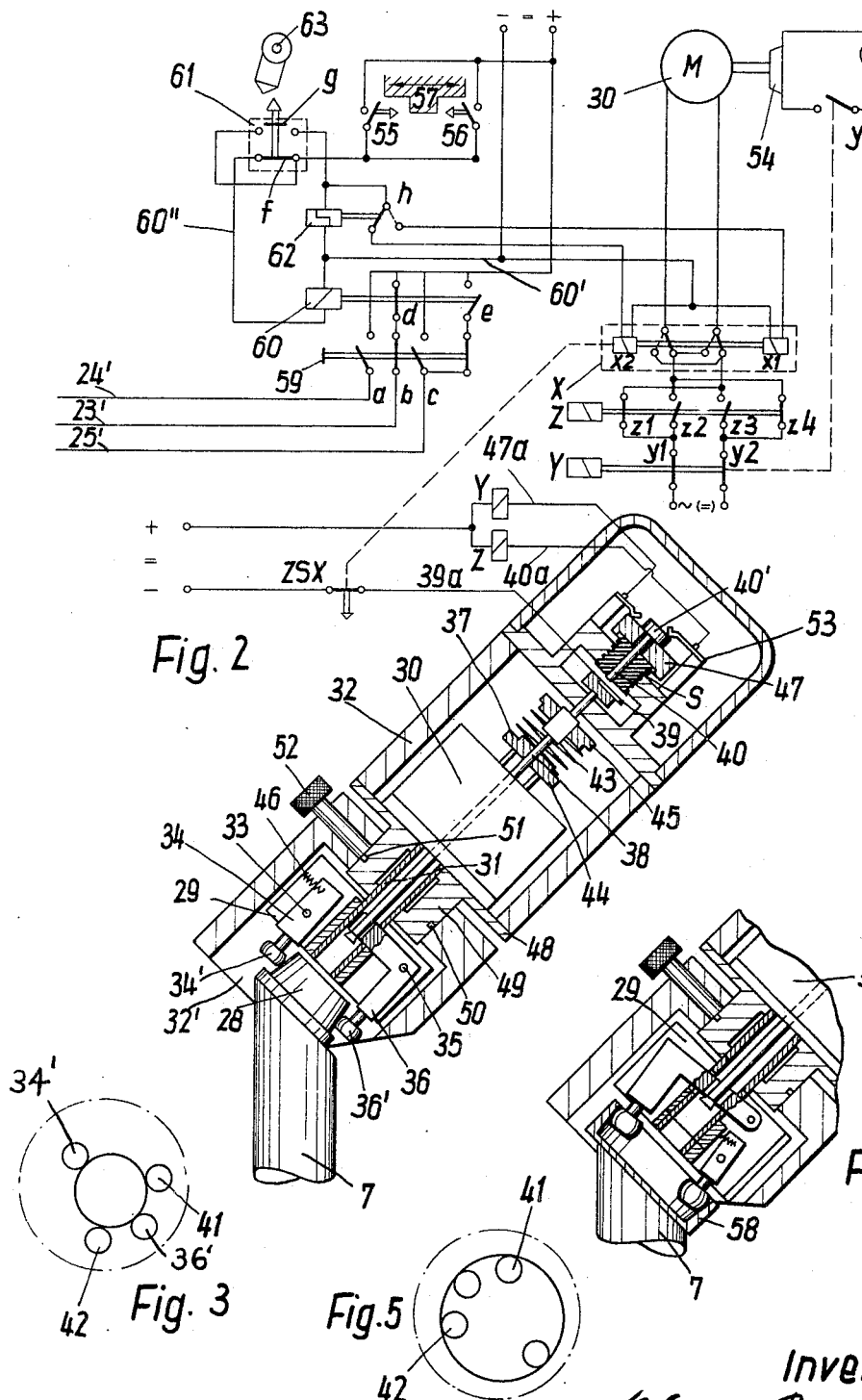

3,512,451
TRACING MECHANISM FOR DUPLICATING MACHINE TOOLS PARTICULARLY DUPLICATING MILLING MACHINES
Hans Schäfer, Langen, near Frankfurt am Main, Germany, assignor to Nassovia Werkzeugmaschinenfabrik G.m.b.H., Frankfurt am Main, Germany, a corporation of Germany
Filed Jan. 17, 1968, Ser. No. 698,628
Int. Cl. B23q *35/04*
U.S. Cl. 90—62                                 10 Claims

ABSTRACT OF THE DISCLOSURE

A tracer device for duplicating machine tools which has an advance control device having a measuring head portion thereof surrounding a measuring organ rigidly fixed to the tracer device for providing an advance control force. The axis of rotation of the measuring head in each direction of tracing forms a diagonal which intersects the tracer axis and which does not coincide with the planes formed by the axes of the machine tool. The tracer stem of the tracing device may be locked in any desired one of three orthogonally related axes and has a stylus holder axially adjustable within the tracer stem. The holder is operatively connected to a signaling device for initiating feed motion. A programming control system is provided for indexing the tracer stem in the three axes of space either manually or automatically.

---

This invention relates to duplicating machine tools controlled by tracers and concerns a tracing mechanism particularly for duplicating milling machines which operates according to the principle of tracer advance and which, with the aid of a feed control device, maintains the tracer stylus in constant contact automatically with a pattern under the influence of a feed control force which is dependent upon the tangent of contact between the tracer and the pattern. Depending upon the direction and the magnitude of the tracer excursions, a signaling device attached to the tracer stem initiates the feed motions of one or several tools. The feed control device and the signaling device form independent control circuits which, by means of the cooperation of a measuring element usually attached to the upper end of the tracer stem, are coupled with a clockwise or counterclockwise rotating measuring head of the feed control device.

While the feed regulating circuit may comprise hydraulic valves, electric contacts, inductive transmitters or signaling devices all attached to the tracer stem, the advance control circuit may include advance control devices, for example, a measuring head driven clockwise or counterclockwise by means of an advance control element and wherein a drive motor is a function of the tangent of contact between the tracer and the pattern. The measuring head cooperates with the measuring element and, with the aid of an advance control force, exerts a continuous pressure on the measuring element and thus on the tracer in a direction which, in the direction of the tracing and the feed, forms an acute angle with the tangent of contact between the tracer and the pattern. Known tracer mechanism of this type use as a measuring head either a ball, a ring, or several bolts attached to the upper end of the tracer stem, and as advance control elements, electrical, hydraulic or pneumatic switches may be used.

The stationary or rotatably driven measuring head surrounds the measuring element in such a way that between an abutment ring or the diameter of an imaginary circle contacting the surface of several abutments and the so-called measuring circle of the measuring element, there exists a difference in diameter so that the element of the measuring head producing the advance control force constantly urges the measuring element into an eccentric position against the abutment ring or against the imaginary circle defined by the plurality of abutments. This eccentricity affects the advance or lead of the tracer and its effective magnitude during the tracing operation, and at the moment of the coincidence of the tangent of contact between tracer and pattern with the pattern contour determines the precision of duplication.

In a known tracing mechanism for duplicating milling machines, the advance control device works electromagnetically and comprises a measuring ball as the measuring element which is attached to the upper end of the tracer stem and functions as an electric contact. A measuring head surrounds the measuring ball and carries a measuring contact. The measuring head urges the measuring ball by means of an advance control force continuously into an eccentric position with respect to the axis of the measuring head against the measuring circle defined by support rollers and is, in the direction of the advance control, driven clockwise or counterclockwise by an electric motor through an electromagnetic reversing gear. In such a tracer mechanism the advance control device is rotatable about the axes passing through the center of the measuring ball, that is, the tracer axis, and it is pivotable about axes normal to and intersecting the tracer axis and may be locked in any desired angular position. In this mechanism the excursion of the tracer stem in one axis may be blocked and thus duplicating may be carried out in one single plane of the space. In order to use such an advance control device for either contour milling or stroke milling in any desired direction of the space automatically in which rotation or swinging of the advance control device about the tracers axis or about an axis normal to the tracer axis is necessary, certain servicing personnel are necessary.

There are known other tracer mechanims of duplicating milling machines which work with a hydraulically operating advance control device comprising three advance control bolts attached to the upper end of the tracer in the direction of the spatial coordinates and a hydraulic valve rotatable in the direction of the advance control counter-clockwise or clockwie about one of the bolts. The piston of the valve forms, together with the advance control bolt, a hydraulic switch. While the number of the possible tracing directions is limited in advance control devices of this type to three coordinate planes of the space each time the tracing plane is changed, the hydraulic valve, functioning as an advance control element together with the measuring head and the element producing the advance control force has to be taken off from the advance control bolt and, by replugging, mounting the same into operational connection with the other advance control bolt. The requirement for servicing is even greater and more time-consuming than in the case of an advance control device where the change has to be effectuated by means of rotating or pivoting. There is also the danger of damaging the advance control device. All known tracer mechanisms of this type require additional driving means for producing the so-called line feed motions which have to be executed at the end of a traced and duplicated line or stroke and which sets to the opposed direction the succeeding stroke or milling line. The line feed motion here is an operation independent and separate from the tracing operation; this fact has a number of disadvantages in practice. Thus, if once the predetermined magnitude and speed of the line feed motion is determined, it is not possible to change within the same milling stroke the direction of stroke over the line feed or stroke feed motion. Instead, it is necessary that the tracer and the duplicating tool proceed to the end of the traced and milled stroke until the tool becomes disengaged before the line feed motion, independent of the tracing operation, may start. Thus, idling motions result which render the manufacturing more expensive.

ADVANTAGES AND SUMMARY OF THE INVENTION

This invention avoids the above-listed disadvantages. According to the principles of this invention it is possible, in the first place, to trace a pattern and to duplicate a corresponding work piece either with contuor milling or with stroke milling in any direction in space automatically without the necessity of changing the position of the advance control device when the tracing plane is to be changed. Secondly, the line feed motion is no longer an additional self-controlled feed motion that is separate from the tracing control. The line feed motion is path-dependent and is designed as a normal tracing feed motion initiated by the advance feed device, that is, the line feed motion is provided for in a manner known heretofore and it is possible to replace it by a change of the tracing plane still within the working zone of the workpiece.

The invention relates to a tracer mechanism for duplicating machine tools and preferably duplicating milling machines which are provided with an advance control device having a portion surrounding a measuring element secured on the tracer stem. The axis of rotation of this portion in each direction of tracing forms a diagonal which preferably intersects the tracer axis and which does not coincide with the planes formed by the axes of the machine. Advantageously, this space diagonal may extend from two mutually normal planes extending in the direction of the tracer axis and the axis of rotation of the portion of the advance control device surrounding the measuring head coinciding with this diagonal may have in each direction of tracing, preferably, angles of equal size formed with the three planes of space. This arrangement of the advance control device remains unchanged for all tracing planes whether it be for stroke milling or contour milling. Advantageously, the advance control device does not have to be re-assembled when the tracing planes are to be changed. Another significant advantage of this arrangement resides in the fact that the heretofore necessary line feed motion is dispensed with. This line feed motion is replaced by a "tracing" feed motion, that is, the tracer and the tool are no longer moved at the end of each stroke transversally to the direction of stroke by a line feed drive mechanism separately from the tracing control in order to set it by the predetermined magnitude, but at the end of each milling stroke, either automatically or manually, it is readjusted from the tracing plane in which the milling stroke extended into another tracing plane in which the desired milling stroke extends with the aid of means for indexing the tracing stem.

In a further embodiment of the invention the rotational axis of the portion of the advance control device driven by a motor in the direction of the advance in a clockwise or counter-clockise manner and formed as a measuring head coincides with the axis or center of the measuring element at elevated advance (concentric position of the measuring element in the measuring circle) and at an effective advance extends parallel thereto whereby the measuring head with a presser element producing the advance control force and with contact elements is urged against the inward face of the measuring element for introducing its start and stop. In such an arrangement the tracer stem is formed in a known manner such that it may be lockably positioned in any desired one of the three axes of the space and has a stylus holder axially adjustable within the tracer stem. The holder may be locked to prevent excursion with respect to the tracer stem in the tracer axis and in which there is operatively connected a signaling device for initiating the feed motion in the vertical axis in space. Further signaling devices, such as a hydraulic control slider for causing feed motions of one or several tools in the other two horizontal axes of space are in engagement with the tracer stem.

For indexing the tracer stem in the three axes of space there are provided means which may be set either manually or automatically, for example, by means of a programmed control. As means for indexing the tracer stem there may be used locking means, such as locking bolts, which are adapted to engage into the tracer stem or into its holding means. These bolts are operable by means of an electromagnet through electric energizing elements either manually or automatically by means of a program control, such as terminal switches limiting the feed motions of the working carriages.

According to the invention as a measuring element one may use a ball, a cylindrical bolt or ring, a conical bolt or ring, and as advance control element of the advance control device one may use a hydraulic, electric or pneumatic switch. Further, the advance control element may initiate the clockwise or counter-clockwise rotating driving motion of the measuring head when there is deviation of the pattern contour from the tangent of contact (tracer excursion) either from a position of rest or from a continuously oscillating motion.

BRIEF DESCRIPTION OF THE DRAWINGS

FIG. 2 is an axial sectional view of a feed control device with an associated electric circuit;

FIG. 3 is a view taken along line III—III of FIG. 2;

FIG. 4 is a partial axial sectional view of a modified embodiment of the feed control device; and FIG. 5 is a view taken along line V—V of FIG. 4.

DESCRIPTION OF THE EMBODIMENT

Figure 1:
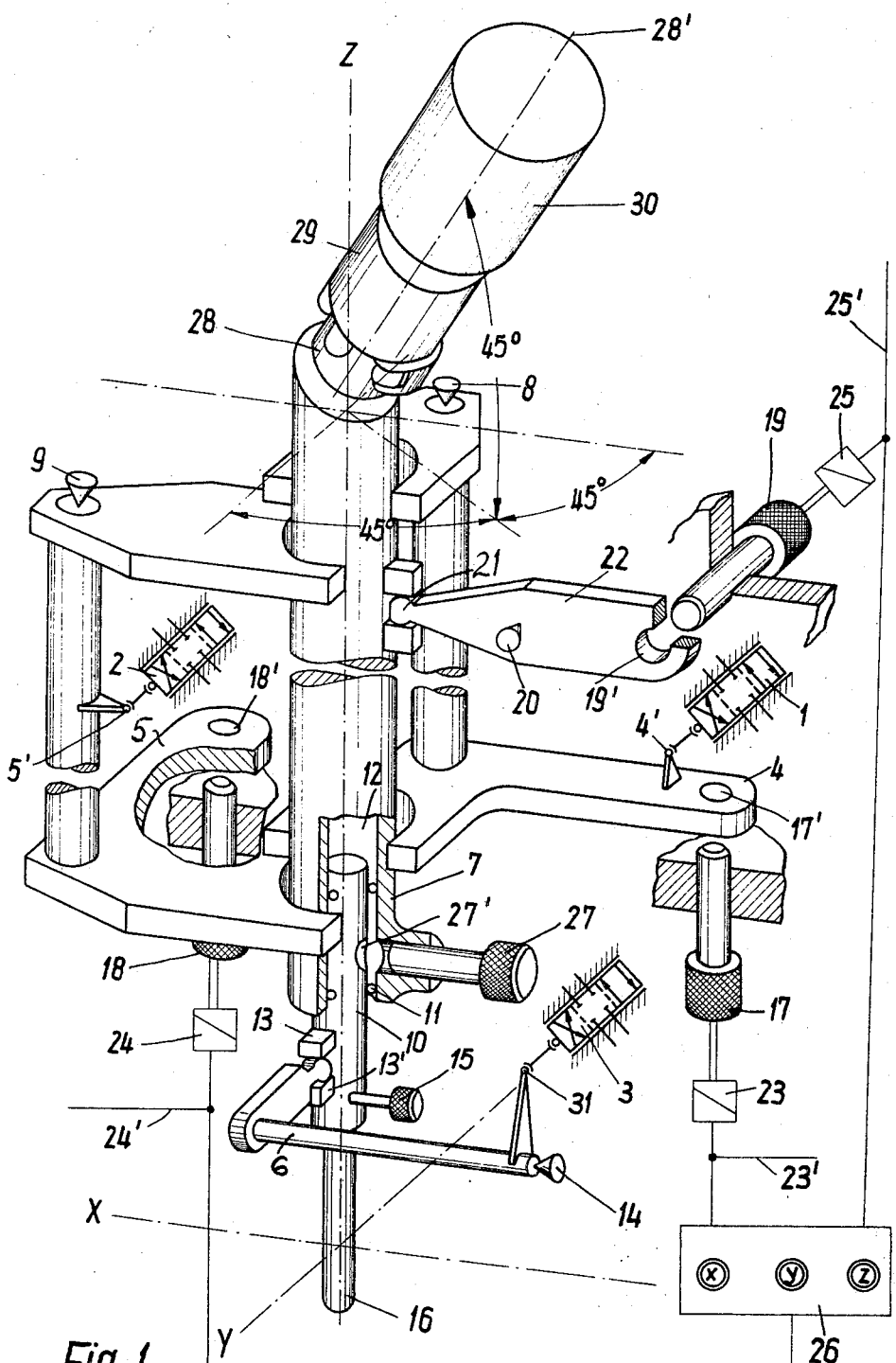
FIG. 1 is an isometrical partially schematic view of a tracer mechanism with a feed control device.

In FIG. 1 there is shown a tracer mechanism for duplicating milling machines having a feed device and a feed control circuit. The feed control circuit includes hydraulic control valves 1, 2 and 3 which are connected to transfer members formed as doubled-forked levers 4 and 5 and angle lever 6 and are connected to a tracer stem 7 for the purpose of following its excursion. The levers are connected by means, not shown, to feed power means for causing the feed motions of working carriages in the three mutually perpendicular axes X, Y and Z. The double-forked levers 4 and 5 are pivotably held at 8 and 9 by the tracer housing (not shown) and embrace the tracer stem 7. The tracer movements in the X direction are transmitted through the forked lever 4 to the hydraulic valve 1 connected thereto by means 4' for initiating the feed motions of a working carriage in the X axis ("lengthwise"). Tracer excursions in the Y direction are transmitted by the forked lever 5 to the hydraulic valve 2 connected therewith by means 5' for controlling the feed motions of a working carriage in the direction of the Y axis ("across"). A cylindrical stylus holder 10 is held by means of ball bearings 11 in an axial bore 12 of the tracer stem 7 and is axially displaceable therein. The holder 10 is provided with two axially spaced studs 13 and 13' between which there is disposed the terminus of the angle lever 6 pivotably secured to the tracer housing at 14. Axial excursions of the tracer stylus 16, which is securely held in an axial bore of holder 10 by means of locking screw 15, are transmitted by the angle lever 6 to the hydraulic valve 3 connected with lever 6 by means 3'. The excursions of the tracer stem 7 in the X or Y axes can be blocked at will by introducing the indexing bolts 17 or 18 into openings 17' or 18' of the respective forked levers 4 or 5. For blocking the tracer excursions in the Z axis, there is provided an opening 19' of a lever 22 pivotally attached to the tracer housing at 20 and engaging the tracer stem at 21. The indexing bolt 19 may be introduced into the opening 19' thus blocking the excursions of the tracer stem 7 in the Z axis. The indexing bolts may be operated manually by means 23', 24', 25', or through electromagnets 23, 24, and 25 associated with a control panel 26. There is provided an additional indexing bolt 27 which when inserted into a bore 27' of the tracer holder 10 serves to index the relative axial displacement of the tracer stylus with respect to the tracer stem 7. The feed control device is disposed at the upper end of the tracer stem. The feed control device comprises a measuring bolt 28 serving as measuring organ and mounted at the upper end of the tracer stem. The measuring bolt 28 is surrounded by a measuring head 29 which, depending on the direction of the feed control, may be stationary or may be driven rotatably to the right or to the left by an electric motor 30. The measuring pin 28 is arranged in such a manner that its axis 28' intercepts the Z axis, and with respect to the ZX and the ZY planes, it forms a space diagonal which lies along the bisector of the angle formed by the XY plane and the Z axis. By the insertion of indexing bolts 17, 18 and 19 into the respective bores 17', 18' and 19', the tracer stem 7 is indexed from all sides, that is, no excursions are possible along the axis of rotation of that part of the feed device which surrounds the measuring organ, thus the axis of rotation of the measuring head 29 coincides with the axis 28' of the measuring pin 28. When, on the other hand, excursions of the tracer stem 7 occur, the axis of the measuring head will assume a position parallel to the axis of the measuring pin. It will be understood to those skilled in the art that instead of a measuring pin, a measuring ring (see FIGS. 4 and 5) or a measuring bolt may be used. In the case where a measuring bolt is used, the axial arrangement of the measuring pin referred to hereinabove applied to the center of the bolt.

In FIGS. 2 and 3 there is shown how an electromechanically operating feed control device may be attached to the upper end of the tracer stem of a tracing apparatus shown in FIG. 1. In this figure, parts which are identical to those shown in FIG. 1, are designated with the same reference numerals. The feed control device per se forms no part of the invention; an inventive feature, however, resides in the particular arrangement on, and its cooperation with, the tracer stem. At the upper end of the tracer stem 7 there is secured as a measuring organ a conical measuring bolt 28 in such a manner that its axis, as already described in connection with FIG. 1, intersects the axis of the tracer stem in a direction which defines the same angle with all three tracing planes. Measuring bolt 28 is surrounded by a measuring head 29 which is rotatably held in housing 32 by means of hollow shaft 31, which at the same time is the driven shaft of an electric motor 30. The measuring head 29 carries in a radial cavity, a lever 34 pivotable about point 33 and an angle lever 36 arranged diametrically from lever 34 in another radial cavity and swingable about a pivot point 35. The angle lever 36 engages with one end into the hollow shaft 31 and is connected therein with a rod 38 axially displaceable within and guided by a flange-shaped bearing 37 closing off the end of the hollow shaft. The free end of rod 38 is connected with an operating element 40 of an electrical switch S through an electric contact 39 which is secured to the end of rod 38 in an electrically insulated manner. The two levers 34 and 36 carry at their ends adjacent the tracer stem freely rotatable presser rollers 34', 36' which engage, at an angle of approximately 15° to the axis of the measuring head, the measuring bolt 28 in such a manner that their faces of contact lie on one conical surface. As shown in FIG. 3, on either side of roller 36', there are provided additional support rollers 41, 42 which are arranged along a common circle and disposed at the measuring head at about 90° from one another. The imaginary circle on the measuring head which forms the path of contact for both rollers 41 and 42, constitutes the measuring circle. The measuring circle has a diameter which is larger than the diameter of the measuring bolt at the contact circle by a value twice that of the adavnce. A compression spring 43 engages an annular shoulder 44 of bearing 37 and at its other end engages an annular shoulder of a nut 45 which, by means of a thread, may be axially adjustable on rod 38. The compression spring 43 through the rod 38 and angle lever 36 exerts a counterforce with respect to a tension spring 46 attached to the lever 34 and supplying a feeding force to the measuring bolt 28. The aforenoted counterforce is adjusted by means of nut 45 in such a manner that its magnitude will be smaller than the feed force so that the pressure roller 34' can position the measuring bolt 28 in an eccentric position with respect to the measuring head and the measuring circle, that is, to position the bolt 28 in an advance position and thus also bring the operating element 40 of the electrical switch S during idling of the machine (when the tracer is not in contact with the pattern) to its maximum position of excursion in which the contacts 40' and 47 are open. By turning the nut 45, the feed force may be indirectly varied by changing the magnitude of the counterforce. The electric motor 30 is secured by means not shown to a cover plate 48 of the housing 32. The plate or disc 48 is provided with an outwardly extending hub 49 having an axial bore in which is journaled the driven shaft 31. The hub 49 is provided at its outer face with a circumferential annular groove 50. The hub 49 is axially adjustably held in a housing member 32' which is attached by means not shown to the housing of the milling machine. The hub 49 may be locked in its selected position with respect to housing member 32' by means not shown. The axial adjustment of hub 49 is effected by rotating an adjusting bolt 52 which has an eccentrically located pin 51 extending into the groove 50. By axially displacing the hub 49 and thus moving the entire housing, including the measuring head, with respect to the housing member 32' and the measuring bolt 28, the magnitude of the measuring circle may be varied.

A simplified circuit diagram in FIG. 2 shows the operation of the feed control means for the driving means associated with the measuring head. The feed control means is constructed as a switch S. As shown, contact 39 is connected to the negative pole of a D.C. current source through a conductor 39a, which includes a time switch ZSX. The contacts 40 and 40' are connected to the positive pole of the same current source through a conductor 40a and arelay Z. The contact 47 is also connected to the positive terminal of the same current source through a conductor 47a and a relay Y.

The tracer mechanism operates in the following manner:

It is assumed that the milling machine is of the straight milling type and that it operates with milling strokes extending in the YZ plane (transverse-vertical). For this mode of operation, the tracer stem is to be blocked so that no excursions may occur along the X axis (longitudinal direction). This blocking may be effected (see FIG. 1) by introducing the indexing bolt 17 into the bore 17' either manually, or by means of electromagnet 23 energized upon actuation of push button X disposed on the control panel 26. The indexing bolts 18 and 19 are in their retracted position so that the tracer rod may execute excursions in the YZ plane. The indexing bolt 27, then, is inserted into bore 27' and remains in this position at all times during straight milling or during two dimensional contour millings.

It is further assumed that the tracer stylus 16 is not in its working position, that is, it is not in contact with the pattern. To this largest excursion of the stylus there corresponds a position or condition of the feed control device and the switch position as shown in FIGS. 2 and 3. The contacts 39, 40 are open and the contacts 40', 47 are closed by virtue of a spring 53. In this position of the tracer (maximum excursion), the measuring bolt 28 has its largest eccentricity with respect to the measuring circle. The measuring bolt engages both support rollers 41 and 42 and, thus, it is in contact with all the rollers of the measuring head. In this idling position of the tracer the measuring head 29 is driven by the motor 30 in one direction whereby the measuring bolt due to its eccentric position with respect to the measuring circle executes an orbiting motion in the YZ plane. It is further assumed that the direction of rotation of the measuring head is in this idling position counter-clockwise. The relay Y is unenergized and its contacts Y1 and Y2 are closed while contact Y3, which is in the motor circuit for operating a motor brake 54, is open. The relay Z is also unenergized so that its contacts Z1 and Z4 are closed while its contacts Z2 and Z3 are open. If now the tracer stylus is manually or automatically moved from its idling position in the direction of a pattern disposed below the tracer and if the tracer during its downward motion is brought into engagement with the horizontally disposed surface of the pattern, it will be axially displaced relative to its original direction of motion whereby the measuring bolt which is rigidly affixed to the tracer stem duplicates this displacement and, as a consequence, loses contact with one of the support rollers, and, since the roller 36 follows the said displacement by virtue of spring 43, the measuring bolt transmits this displacement by means of angle lever 36 and rod 38 to the electric switch S. As a result contacts 39 and 40 will close whereby the switch assumes its basic position in which all contacts are closed. At this moment the tangent of contact between the tracer stylus and the pattern coincides with the contour of the model and as a result, the measuring head stands still. The relay Y is energized whereby contacts Y1 and Y2 are opened and contact Y3 is closed. The brake 54 is thereby actuated and the motor current for motor 30 is interrupted. The relay Z is also energized and as a consequence, contacts Z1 and Z4 are opened while contacts Z2 and Z3 are closed whereby the conductors for a future change in the rotational direction of motor 30 have been exchanged or switched. The measuring bolt is now displaced by a distance corresponding to the effective advance inside the measuring circle and by means of the feed control force, it is urged against one support roller in an acute angle to the surface of the pattern in the direction of tracing. The displacement of the tracer stem causes hydraulic valve 2 to open and thus control the corresponding feed motion of the working carriages which carry in the Y axis either a workpiece and the pattern, or a tool and a tracer head.

If now the tracer stylus travels in engagement with a rising pattern contour and is again deflected in the direction of its Z axis, the contacts 40', 47 of switch S open whereby the relay Y is de-energized causing contacts Y1 and Y2 to close, while contact Y3 remains open and the relay Z remains energized. The measuring head is driven clockwise as long as the direction of the feed control force again attains the predetermined acute angle with the tangent of contact between the tracer stylus and the pattern. At this moment, the switch S again assumes its basic position in which all its contacts are closed, and the driving motor and the measuring head are stationary. By changing the direction of the feed control force and the resulting excursion of the tracer stylus, valve 3 has been opened so that now the feed motion of the tracer stylus and the tool, or, respectively, the pattern and the workpiece, proceed in the YZ plane.

If, on the other hand, the tracer stylus is deflected by the feed control force as it is urged against a downwardly sloping surface of the pattern contour, that is the tracer is deflected downwardly in the direction of the Z axis, the switch S will assume a position corresponding to that during the approaching motion so that the measuring head will be driven to the right or counter-clockwise. For the automatic reversal of the feed motion at the end of a milling stroke, there may be provided at the machine stands for each direction a terminal switch which may be actuated by appropriate lugs secured to the machine carriages executing the corresponding feed motions. In FIG. 2 there are shown two such terminal switches 55, 56 with a lug 57 for one axis, for example, the Y axis. The reversal of the stroke direction is coupled with the line feed. In any case, this line feed motion is no longer an independent operation separated from the tracer operation per se, but the line feed itself occurs as a tracer operation with changed stroke direction (for example, running in the XZ tracer plane) whereby the indexing bolt 18 has to be in bore 18' whereas the indexing bolt 17 has to be retracted. Instead of a tracing operation in the XZ plane, the line feed may also be effectuated as a tracer operation in the XY plane (contour milling). The selection of the tracing plane for the line feed motion depends upon the form of the pattern. In the example described hereinbefore, the tracing operation should succeed the line feed as an indepedent tracer operation in the XY plane. This plane is preselected by means of a selector switch 59, the contacts a, b, c, of which are in electrical contact with the solenoids 23, 24 and 25 (FIG. 1) through conductors 23', 24' and 25'. The position of contacts of selector switch 59 (as shown in FIG. 2) corresponds to a tracer operation in the XY plane representing a line feed, that is, the indexing bolts 17 and 18 are withdrawn while the indexing bolt 19 is advanced. The contacts of the selector switch electrically communicate with contacts d, e of a relay 60 which is connected to the negative terminal of a D.C. current source through conductor 60'. The relay 60 is connected by means of conductor 60'' to the positive terminal of the same current source through a contact f of a switch 61 and terminal switches 55 and 56. Another contact g of switch 61 is connected with the two magnetic switches X1, X2 through the reversing contact h of an impulse relay 62.

As set forth hereinbefore and referring to the circuit diagram of FIG. 2, the selector switch 59 is set for a line feed to be traced in the XY plane. As long as the working carriage still moves in the direction of stroke (YZ plane), current flows across contacts d, b, conductor 23' to electromaget or solenoid 23, which remains energized, and keeps the indexing bolt 17 inserted in bore 17' thereby preventing an excursion of the tracer stem 7 in the X axis.

If now at the end of the milling stroke the working carriage, by means of lug 57, hits the terminal switch 55, current will flow across contact f energizing relay 60, the contact d of which opens and contact e closes. The magnet 23, then, is de-energized and pusls the indexing bolt 17 to thereby liberate the tracer stem for a deflection or excursion in the X axis. At the same time, however, magnet 25 is energized by means of a current flow across contact c and the conductor 25' and the indexing bolt 19 is then inserted into the bore 19' thereby preventing any excursion of the tracer in the XY plane. With the changed tracing plane (XY), the feed control force effects in the feed control device a similar deflection of tracer stem 7 in the same plane and, consequently, a displacement of valves 1 and 2 to thereby introduce a feed motion in the changed tracer plane XY.

The half length of this feed motion (previously, magnitude of line feed) is electromagnetically set by means of a path-dependent counting mechanism, known per se, and not shown or described here in detail. The counting mechanism has an operating member 63 attached to the means for causing the feed motion of the working carriage and, upon completion of the set path length, actuates the switch 61. Thereby the contact g is closed and the contact f is opened. As a result, the relay 60 is de-energized, contact d closes and contact e opens so that the operation of the indexing of the tracer stem described hereinbefore (indexing bolt 17 is inserted whereas bolts 18 and 19 are retracted) is again re-established. On the other hand, the impulse relay 62 is energized, the contact h of which locks into the position shown in dotted lines.

Thereby the magnetic switch 1 is energized and the conductors of motor 30 are crossed. At the same time, the time switch ZSX is energized whereby the relays Z and Y are de-energized which would lead to a counter-clockwise rotation of the motor 30. However, due to the previously effected reversal of the motor terminals by means of the magnetic switch X1 in the desired clockwise direction of rotation, such a counter-clockwise rotation will be avoided. The motor and the measuring head rotate to the left or clockwise as long as the measuring head assumes a position in which the direction of the feed control force points opposite to the direction of the precedingly traced stroke direction. When this position is just about attained, the time switch ZSX closes its contact and the measuring head again resets itself automatically in its advance position in which the direction of the feed control force again forms the predetermined angle with the tangent of contact between the tracer stylus and the pattern. This time, however, the effective direction is reversed.

The advance motion of the working carriage proceeds now in the tracing plane YZ but in the oppoosite direction so that the terminal switch 55 opens and the adjusting member 63 is brought into its initial position by a return mechanism (see FIG. 2).

The selector switch 59 in the embodiment shown in FIG. 2 is provided, for the sake of simplicity, with only those contacts which are necessary for the reverse switching within the tracing planes XY and YZ. It is to be understood that for additional tracing planes this selector switch must contain the necessary additional number of contacts.

For a straight milling in the XZ plane, the control operations described hereinabove also apply with the change that the indexing bolt 18 is inserted into bore 18' and the indexing bolt 17 is retracted, while bolt 19 remains retracted and bolt 27 remains inserted. For a two-dimensional contour milling, indexing bolts 17, 18 and 27 are retracted while bolt 19 is inserted.

In FIGS. 4 and 5 there is shown the same feed control device as in FIG. 1 with the difference that, instead of a measuring bolt 28 (FIG. 1), there is provided a measuring ring 58 secured to the upper end of the tracer stem 7. The springs 43 (not visible in FIG. 4) and 46 operate in the reverse direction, that is, the spring 43 is a tension spring while spring 46 is a compression spring. The mode of operation is the same as shown and described in connection with FIGS. 1 and 2.

The axis of the measuring ring 58 coincides with the axis of rotation of the measuring head with the axis of rotation of the measuring head with the tracer stem indexed in all planes, and this axis intersects the tracer axis in a direction which is formed by the angle bisector of the XY axis and by the angle formed between the XY plane and the Z axis. While the axis of the meaasuring ring remains constantly in this position, the axis of rotation of the measuring head coincides with the axis of the measuring ring. During the course of the tracer operation in certain positions of tracer excursion, the axis of rotation of the measuring head is parallel to the axis of the measuring ring. Instead of a measuring bolt or a measuring ring, one may use a measuring bore, and instead of an electrically operating feed control device, one may use a hydraulic valve system to cause a stationary clockwise or counterclockwise rotation of the measuring head. Variations of this type are deemed to be within the scope of the inventioin as long as the particular positioning of the measuring element and the feed control device are maintained according to the principles of this invention.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

What is claimed is:

1. In a tracing device for duplicating machine tools, the combination comprising, a measuring organ rigidly affixed to said tracer device, an advance control device provided with a rotatably drivable measuring head surrounding the axis of said measuring organ and having an advance control element transmitting an advance control force to said tracer device for maintaining said tracer device in continuous contact with a model, said tracer device being swingable into all directions and indexable in each of the three planes of motion of the machine tool, and having means for automatically setting its direction of advance as a function of the tangent of contact between said tracer device and said model, control means effected by the excursions of said tracer device for automatically setting said advance direction, whereby the axis of said measuring organ and said measuring head intersect the axis of said tracing device and forms with each of the three planes of motion of the machine tool an angle of substantially 45°.

2. In a tracing device as defined in claim 1, wherein the axis of rotation of said rotatably drivable measuring head lies in each tracing direction along space diagonals formed by mutually perpendicular planes extending in the tracing direction.

3. In a tracing device according to claim 1, wherein the rotational axis of said measuring head forms in every tracing direction equal angles with the three planes of the space.

4. In a tracer device as defined in claim 1 being further provided with a tracer stem having means for selectively securing said stem in one of the three axes of motion of space, said tracer stem having an axially displaceable stylus holder disposed therein, said displaceable holder having means for limiting its freedom of displacement in the direction of the tracer axis.

5. In a tracer device according to claim 4 including means for indexing the tracer stem in one of the three spatial axes.

6. In a tracer device according to claim 5 including means responsive to programmed control means for indexing the tracer stem in one of three spatial axes.

7. Tracer device according to claim 6, wherein the means for indexing the tracer stem includes locking means extending into the tracer stem, said locking means being responsive to an electric solenoid means.

8. In a tracer device according to claim 7, wherein said solenoid means is provided with manually operable control means.

9. In a tracer device according to claim 7, wherein said solenoid means is provided with an automatic control means having terminal switch means flanking the feed motions.

10. In a tracer device according to claim 4 having a first hydraulic valve operating device engaging said tracer stem, said first operating device introducing feed motions of one or several tools in a horizontal spatial plane, and a second hydraulic valve operating device engaging said stylus holder slidably disposed in said tracer stem for introducing a feed motion in a vertical direction.

References Cited

UNITED STATES PATENTS

| | | | |
|---|---|---|---|
| 2,786,396 | 3/1957 | Wetzel | 90—62 |
| 2,796,806 | 6/1957 | Schlapp | 90—62 |
| 2,858,172 | 10/1958 | Schlapp | 90—62 |
| 3,114,295 | 12/1963 | Ronner et al. | 90—62 |
| 3,241,455 | 3/1966 | Kohl | 90—62 |
| 3,353,449 | 11/1967 | Schlapp | 90—62 |
| 3,358,562 | 12/1967 | Schlapp et al. | 90—62 |
| 3,368,456 | 2/1968 | Kohl et al. | 90—62 |
| 3,373,659 | 3/1968 | Bohme | 90—62 |

GERALD A. DOST, Primary Examiner

PO-1050
(5/69)

UNITED STATES PATENT OFFICE
CERTIFICATE OF CORRECTION

Patent No. 3,512,451      Dated May 19, 1970

Inventor(s)      Hans Schäfer

It is certified that error appears in the above-identified patent and that said Letters Patent are hereby corrected as shown below:

Col. 2, line 42, "clockwie" should read --clockwise--;

Col. 3, line 9, "contuor" should read --contour--; line 56, "counter-clockise" should read --counter-clockwise--;

Col. 5, lines 16 and 17, "lies along the bisector of the angle formed by the XY plane and the Z axis." should read --lies along the bisector of the angle formed by the ZX and ZY planes and along the bisector of the angle formed by the XY plane and the Z axis.--; line 31, "applied" should read --applies--; line 74, "adavnce" should read --advance--

Col. 6, line 44, "arelay Z" should read --a relay Z--; line 66, "fhe" should read --the--;

Col. 8, lines 39 and 40, "electromaget" should read --electromagnet--; line 48, "pusls" should read --pulls--;

Col. 9, line 22, "oppoosite" should read --opposite--; lines 49 and 50, "with the axis of rotation of the measuring head" should be deleted.

SIGNED AND
SEALED
OCT 6 -1970

(SEAL)
Attest:

Edward M. Fletcher, Jr.
Attesting Officer

WILLIAM E. SCHUYLER, JR.
Commissioner of Patents